United States Patent [19]

Chalmers

[11] 4,083,944

[45] Apr. 11, 1978

[54] REGENERATIVE PROCESS FOR FLUE GAS DESULFURIZATION

[75] Inventor: Franklin S. Chalmers, Cleveland, Ohio

[73] Assignee: Arthur G. McKee & Company, Independence, Ohio

[21] Appl. No.: 751,658

[22] Filed: Dec. 17, 1976

[51] Int. Cl.$^2$ ............................................. C01B 17/04
[52] U.S. Cl. ............................... 423/567 A; 423/571; 423/574 L; 423/578
[58] Field of Search ............... 423/242, 567, 571, 574, 423/578

[56] References Cited

U.S. PATENT DOCUMENTS

| 1,990,602 | 2/1935 | Guennsey et al. | 423/578 |
| 3,535,083 | 10/1970 | Smith | 423/567 X |
| 3,600,131 | 8/1971 | Shah | 423/567 |
| 3,773,900 | 11/1973 | Roberts et al. | 423/567 X |

FOREIGN PATENT DOCUMENTS 948,378   6/1974   Canada.

*Primary Examiner*—G. O. Peters
*Attorney, Agent, or Firm*—Bosworth, Sessions & McCoy

[57] ABSTRACT

A continuous process is disclosed for removing sulfur dioxide from stack gases or other gaseous effluents without prior gas cleaning or dust removal and for converting the sulfur values to industrially useable elemental sulfur. The uncleaned gaseous effluent is scrubbed using a buffered absorbent to absorb the $SO_2$ and remove particulate material, and the undissolved particulate material is removed from the scrubbing liquor as by filtration. The scrubbing liquor is then contacted with sulfide ion to form elemental sulfur while regenerating the absorbent in the liquor. Most of the liquor is separated from the precipitated sulfur and solid impurities, and the remaining material is heated to permit gravity separation of molten sulfur, scrubbing liquor and impurities. The separated scrubbing liquor is recycled for the scrubbing steps.

The process is particularly advantageous when employing a sulfide ion source, such as sodium bisulfide or the like, to precipitate elemental sulfur. The NaHS solution is regenerated, for example by treating a portion of the scrubber effluent with calcium sulfide.

24 Claims, 3 Drawing Figures

REGENERATIVE PROCESS FOR FLUE GAS DESULFURIZATION

DISCLOSURE OF THE INVENTION

FIELD OF THE INVENTION

This invention relates to the removal of sulfur dioxide $SO_2$, and associated sulfur containing compounds such as sulfur trioxide and sulfuric acid, from gaseous emissions such as stack gases from industrial plants; and more particularly to the removal of sulfur dioxide and such compounds from such gaseous emissions containing solid particulate material.

BACKGROUND OF THE INVENTION

In recent years governmental and other bodies have become increasingly active in resisting air pollution. Concentrations of $SO_2$ in the atmosphere are one form of air pollution that has evoked much criticism. In the past, industrial facilities, such as electrical power plants, sulfuric acid plants, metal smelters, and petroleum refineries merely vented their flue gases containing sulfurous emissions to the atmosphere. The growth and concentration of industrial facilities emitting sulfur oxides gradually increased the ground level $SO_2$ concentrations and airborne particulate sulfates derived from $SO_2$ to levels considered to constitute harmful pollution.

Initially, the problem of reducing ground level $SO_2$ concentrations was solved by high stacks which would more widely distribute the $SO_2$, to maintain the $SO_2$ concentration level below the polluting level. Further expansion of industry and an awareness of the mechanisms by which $SO_2$ is converted to harmful sulfate particulate dispersions in the atmosphere have caused tightening of governmental-imposed $SO_2$ pollution limits, which has forced both industry and government to seek processes for reducing or eliminating $SO_2$ pollution.

A number of processes have been proposed for the purpose of reducing $SO_2$ emissions, and have been successful to varying degrees. Initial commercial attempts generally fell into the category of "throwaway" processes. These processes are characterized by the conversion of $SO_2$ to, for example, calcium sulfite or calcium sulfate, or a mixture thereof, that is discarded in a landfill. These approaches have helped in the area of air pollution, but do not result in elimination of other pollution, since the sulfite which has a high chemical oxygen demand can be leached and thus pollute ground waters. Recent attempts have therefore been directed to finding an economically viable method for recovering a useful product while avoiding $SO_2$ or other pollution. The present invention provides such methods and also relates to converting the $SO_2$ pollutant to essentially pure elemental sulfur of a quality useful to industry.

German Patent publication No. 2,001,284 discloses a process for treatment of waste gases from a sulfur recovery plant. Waste gas is contacted with an aqueous solution of an absorbent in which the water acts as the main catalyst for reaction of $H_2S$ and $SO_2$ to sulfur. A first solution is formed by reacting $H_2S$ and an absorbent; the absorbent containing $SO_2$ is then reacted to form a second solution. The first and second solutions are reacted to regenerate the absorbent and to release sulfur in a slurry, which is subjected to heating and melting to separate the sulfur, and the absorbent is recycled to the absorber reactor. This German publication teaches the use of conventional absorbents for $H_2S$ in the process. Examples of the absorbents include $K_3PO_4$, $K_2CO_3$, and $Na_3PO_4$ as well as methyl, diethyl, and triethyl amines. Each of these absorbents is highly alkaline, resulting in a high pH in the absorption zone; the use of $K_3PO_4$, for example, may result in the formation of colloidal sulfur.

U.S. Pat. No. 2,031,802 describes a process wherein solutions of monobasic phosphates and sodium citrate are disclosed as suitable solutions for absorption of $SO_2$; the $SO_2$-laden solution is regenerated by heating it to its boiling point to drive off the $SO_2$. U.S. Pat. No. 2,368,595 discloses the use of tripotassium phosphate, a highly alkaline material, as an absorbent for $SO_2$ and $H_2S$, followed by stripping of the $SO_2$ and $H_2S$ from the absorption media. U.S. Pat. No. 2,563,437 discloses absorbing $SO_2$ in $Al_2(SO_4)_3$ and $H_2SO_4$ and then reacting the solution with $H_2S$ to produce filterable sulfur, separating the sulfur, and recycling the supernatant liquid. U.S. Pat. No. 2,729,543 discloses the absorption of $SO_2$ by salts of acids which can be buffered in the 4 to 6 pH range, specifically citing citric acid. The solution containing dissolved $SO_2$ is contacted with $H_2S$ to precipitate sulfur.

Another prior process is the Bureau of Mines process, described in detail in Bureau of Mines Report of Investigations/1973 Report RI 7774, discussed later herein.

All of the numerous processes described in the prior art have one or more grave disadvantages. These disadvantages include (a) loss of absorbent from the system, e.g., by volatilization, absorption on the sulfur product, or decomposition; (b) difficulty of, or consumption of large quantities of energy for, separating $SO_2$ from the absorption medium; (c) failure to produce a satisfactory sulfur product for reuse in a captive process or for resale on the market; (d) production of undesirable waste materials which cause further pollution; or (e) requirements for separate equipment and treatment of the $SO_2$-laden gases to remove particulate material from the gases prior to treatment to remove $SO_2$. Each of these disadvantages also results in undesirably high capital or operating costs or both, making installation of the abatement process impractical.

In all of the known systems wherein elemental sulfur is the desired product, the $SO_2$-laden gases are cleaned to remove particulate material prior to absorbing the $SO_2$ therefrom. The instant invention does not require such prior cleaning of the $SO_2$ laden gases, or the high equipment and operating costs for such cleaning, while producing a comparable sulfur product.

The principal object of the present invention is to provide a process for reducing $SO_2$ in gaseous emissions to far below the present level in an economically practicable manner and without causing further pollution problems.

SUMMARY OF THE INVENTION

This invention involves processes for the prevention or reduction of $SO_2$ pollution in a manner that minimizes capital investment while producing a useful product, sulfur. A novel aspect of the invention is that no prior cleaning of $SO_2$-laden gaseous effluent is required to remove $SO_2$ and produce an elemental sulfur product, as is required in all of the prior art processes.

Preferably, the process of the invention involves scrubbing $SO_2$-laden gaseous effluents such as flue gases from power plants, smelters or the like, with a buffered absorbent solution without need for prior high efficiency cleaning or dust removal. Many such buffered absorbents are known in the art, as indicated below, and any of these can be utilized in the present invention. A preferred absorbent is an aqueous citrate solution, which absorbs the $SO_2$ from the gaseous effluent most effectively. The liquid effluent from even a properly selected and engineered known scrubber used as the $SO_2$ absorber, contains particulate matter such as dust as well as the $SO_2$ values from the effluent gases. The insoluble particulate matter is then separated, as by filtration, from the $SO_2$-laden solution. Soluble impurities scrubbed from the gaseous effluent remain in the slightly acidic solution, gradually build up in the closed cycle process, eventually precipitate, and thereafter are separated from the sulfur product later in the process. After filtering, the $SO_2$-laden absorbent solution is contacted with sulfide ion in the form of $H_2S$ gas or an aqueous solution of NaHS or other alkali metal or ammonium bisulfide. The sulfide ion precipitates elemental sulfur and regenerates the absorbent solution so that it can be recycled to absorb additional $SO_2$.

The precipitated sulfur along with the previously mentioned precipitated impurities are separated from the regenerated absorbent solution by suitable means, preferably by closed system entrained air flotation to produce an easily pumped and stored sulfur-containing slurry, or by addition of a hydrocarbon reagent such as kerosine or oil to cause flotation of a powdery sulfur containing about 50% moisture which is skimmed off, or by decantation or by a combination of such means, or by other means. The sulfur with impurities and some unseparated absorbent solution are then heated under pressure so as to melt the sulfur without volatilizing the absorbent solution. The precipitated impurities therein have much higher melting points than the sulfur, and are less dense than the molten sulfur particularly as they agglomerate or otherwise grow in particle size, and thus gradually rise to the surface of the molten sulfur. Pure sulfur is then removed from the bottom of the sulfur layer. The absorbant and impurities can be removed periodically as required after sufficient build-up and may be easily separated from either molten sulfur or from the aqueous layer, as by filtration.

The preferred form of the instant invention utilizes a novel sulfide ion source, namely sodium bisulfide, NaHS or other alkali metal or ammonium bisulfide, or mixtures thereof. The use of such sulfide ion source permits great savings in capital equipment required and other advantages. When $H_2S$ is utilized as a sulfide ion source, only about one-third of the produced sulfur is product since two-thirds of the produced sulfur is used to produce the $H_2S$ gas required for operation of the process. When NaHS or other above mentioned preferred sulfide ion source is used, substantially all sulfur produced is product. When using such sulfide ion source, the $SO_2$-laden absorbent solution exiting the scrubber used as the $SO_2$ absorber is split, with approximately one third going to the normal sulfide precipitation and approximately two-thirds going to bisulfide regeneration. In making this split, it is preferable to insure that all solid impurities go into a slurry with the solution for the bisulfide regeneration. This may be done by use of a suitable filter. Such slurry is then contacted with strong solution of an alkaline earth metal sulfide, preferably calcium sulfide, which reacts with the sulfites and bisulfites of alkali metal or ammonium in the solution to precipitate the alkaline earth metal sulfite and at the same time generate alkali metal or ammonium bisulfide solution for use in the sulfur precipitation step. The solid alkaline earth metal sulfite is then separated as by setting and decantation from the generated bisulfide solution and is then reduced back to the alkaline earth metal sulfide by any known process, such as calcining with coke or coal. The resulting impure solid material may be water leached to obtain a strong alkaline earth metal bisulfide solution for reuse in the process and the insoluble residue may be discharged to waste such as an ash pit.

The remainder of the process may be as previously indicated.

DESCRIPTION OF PREFERRED EMBODIMENTS

Figure 1:
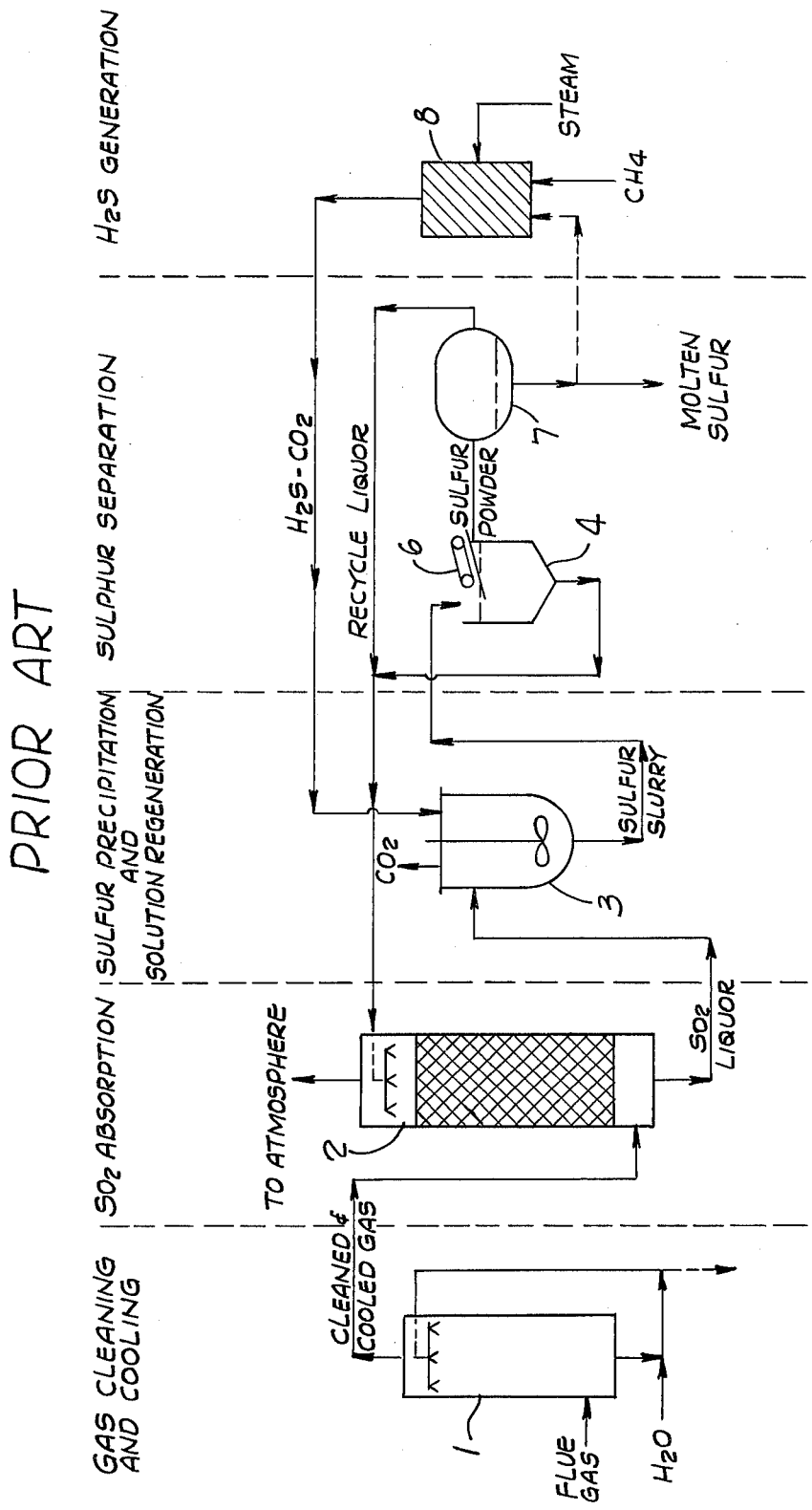
FIG. 1 of the drawings depicts the prior art process most similar to the instant invention.

The prior art citrate buffered process illustrated by FIG. 1 for recovering $SO_2$ from smelter and other industrial gas as elemental sulfur generally comprises the following unit operations. Gas containing 1 to 3 percent, or less or more, $SO_2$ by volume is washed to remove particulate matter and $SO_2$ and cooled to about 50° C. or adiabatic saturation as the case may be, gas cleaning and cooling taking place in known scrubber 1. The gas is then passed upward through a packed absorption tower 2 countercurrent to a downward flow of a citrate solution containing approximately 190 grams of citric acid ($C_6H_8O_2$) and 80 grams of $Na_2CO_3$ per liter. Over 90% of the $SO_2$ is absorbed by the citrate solution. The loaded solution, which may contain 10 to 20, or less or more, grams of $SO_2$ per liter, is reacted with $H_2S$ in a stirred closed vessel 3 to precipitate the absorbed $SO_2$ as sulfur. A residence time in a single regeneration reaction vessel of about 10 minutes is sufficient if pure $H_2S$ gas is used, while two or three reactors in series counterflow are required for less pure $H_2S$ such as from a steam-methane-sulfur $H_2S$ generator. In any event, the regenerator reactor temperature must be at least about 50° C. The slurry of citrate solution and sulfur is separated in vessel 4 by adding kerosine, light oil, or other hydrocarbon which causes the sulfur precipitate to immediately rise to the surface of the citrate solution where it is skimmed off by mechanical means 6. The sulfur has a dry appearance but still contains about 50% of moisture as citrate solution. The stripped citrate solution is recycled to the absorption tower 2. The sulfur product is heated in an autoclave 7 at 130° C. and 35 psi to melt the sulfur and recover residual citrate solution for recycle. Two-thirds of the molten sulfur is then converted to $H_2S$ for use in the sulfur precipitation reactor by vaporizing the sulfur and reacting the sulfur vapor with natural gas or methane and steam in the presence of an alumina catalyst at $H_2S$ generator 8.

The present invention can be successfully utilized to remove $SO_2$ from all types of $SO_2$-contaminated gaseous emissions including flue gas, waste gas from ore smelters or power plants as well as off-gas from industrial processes such as the Claus route to making sulfur from hydrogen sulfide. The present invention is particularly suited to the cleanup of $SO_2$-containing gaseous emissions which are also contaminated with entrained solids such as dust or fly ash, because the sulfur-solid contaminant separation technique of the present invention is so effective as to permit the elimination of the step of cleaning and cooling before the scrubbing step for $SO_2$ absorption, that has heretofore been required in most if not all prior $SO_2$ absorption processes. This discovery of an effective sulfur-solid contaminant separation technique is of major economic significance in that major capital outlays for expensive gas cleaning operations as well as their operating costs are avoided. The manner of this effective separation is two-fold.

First, the insoluble portion of the total solids picked up by the buffered absorbent in an $SO_2$ absorber such as a scrubber is removed by filtration after leaving the absorber. Second, the dissolved solid materials which get through this filtration step slowly build up in the circulating buffered solution and ultimately precipitate, and are removed either on the next pass of the solution through the filtration step or are separated from the sulfur in the sulfur separation step of the process. In the sulfur separation step the sulfur is melted and can readily be filtered from the remaining precipitated solids. However, even this filtration can be avoided because it has been found that the precipitates which contaminate the sulfur are predominantly substances containing metallic salts, are insoluble, and have a density less than molten sulfur and therefore rise to the top of a molten sulfur pool, allowing essentially pure sulfur to be decanted from beneath the layer containing the contaminants.

The aqueous buffered absorbent solution used in the practice of this invention can be any of those commonly known and used in prior absorption $SO_2$ recovery systems. Typical absorbent solutions would be water solutions of alkali metal phosphates or carbonates such as $K_3PO_4$, $K_2CO_3$, and $NaH_2PO_4$, mixtures of $Al_2(SO_4)_3$ and $H_2SO_4$, polyalkenoic acids such as polyacrylic acid or polymethacrylic acid, other organic acids or monobasic or dibasic salts of acids such as acetic, lactic, malic, glycolic, succinic and others, mixtures of $Na_2HPO_4$ and $NaH_2PO_4$, citric acid or salts thereof, polythionic acids and salts thereof, or other known absorbents. For clarity the absorbent will hereinafter be described as an aqueous solution of sodium citrate, although other known absorbents can be used.

The precipitation of elemental sulfur and regeneration of the absorbent solution is accomplished by contacting the $SO_2$ pregnant liquor with sulfide. Hydrogen sulfide, $H_2S$, gas can be utilized for this purpose in the practice of the present invention. However, in the preferred embodiment of the invention to be described in connection with FIG. 3, an aqueous solution of NaHS is preferred for supplying the sulfide ion because of its many advantages.

Figure 2:
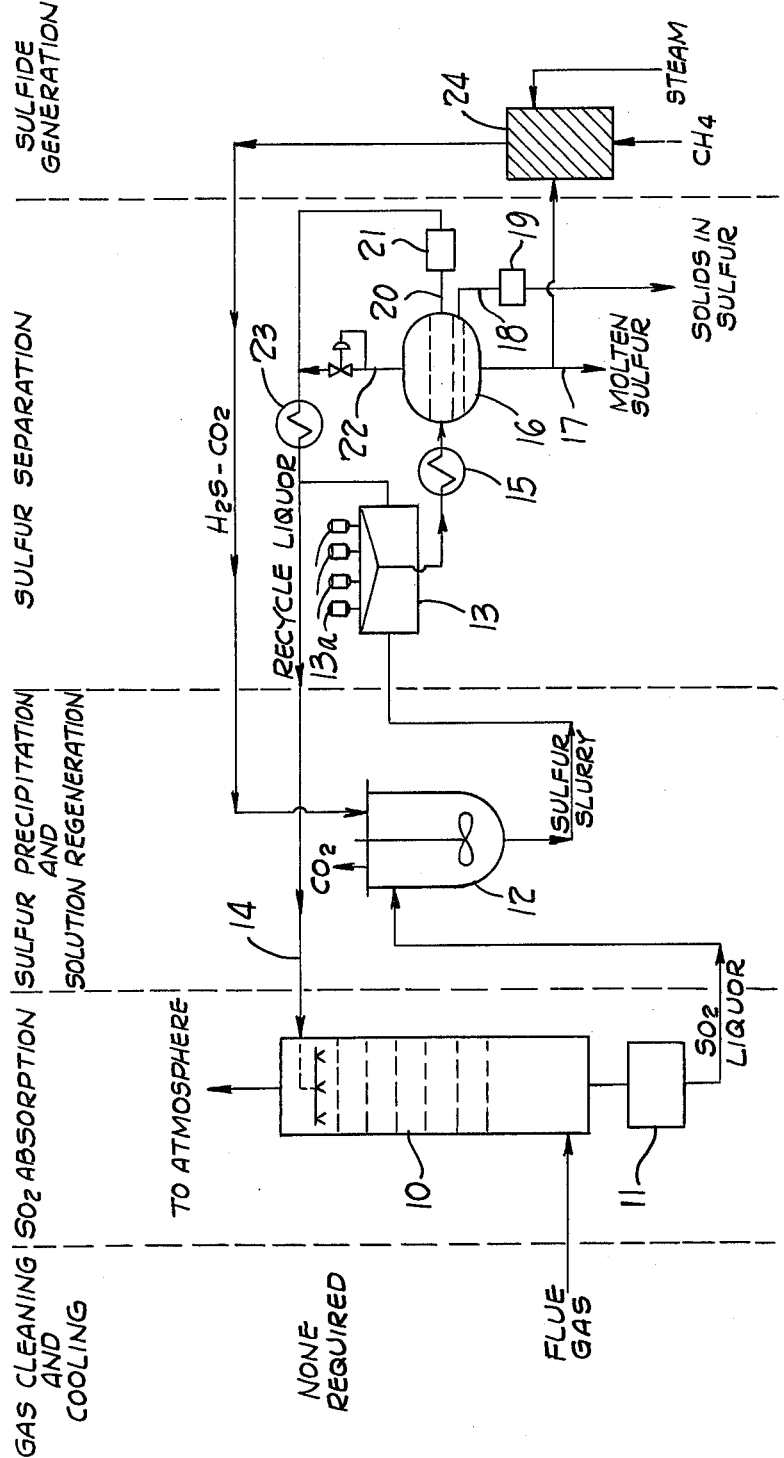
FIG. 2 illustrates the present invention utilizing $H_2S$ as the sulfide ion source.

In the process of the invention illustrated in FIG. 2, gas cleaning and cooling prior to absorption is not needed due to an efficient separation technique used in the sulfur separation portion of the process. Absorption of $SO_2$ in accordance with the instant invention may be generally similar to that of the prior art process discussed above, except for elimination of the need for and step of prior cleaning and cooling of the incoming gas prior to absorption. The gas containing $SO_2$ and entrained particulate solids is passed upwardly through a packed absorption tower 10 countercurrent to a downward flow of citrate solution containing approximately 190 grams of citric acid and 80 grams of $Na_2CO_3$ per liter, this citrate solution absorbs more than 80% of the $SO_2$ from the gas.

A major problem caused by entrained solids is a possibility of contamination of the elemental sulfur product; this problem is solved by the novel separation technique of the present invention.

A secondary problem which might result when uncleaned gases are utilized in the absorption unit operation is plugging of the absorption tower. However, this can be handled by proper design of the absorption tower to cause entrained solids to be caught up in the absorbent and carried from the absorption tower. In extreme cases, multiple in-line scrubbers could be utilized when handling extremely dirty gases. For instance, the dirty gases could first be passed through a Venturi type scrubber to remove most of the solid contaminants while $SO_2$ was absorbed, and then passed through a tray-type or spray tower absorption unit for further absorption of $SO_2$.

In the absorption of $SO_2$, the higher the pH of the absorbent the more effective the absorbent. However, a lower pH favors the chemical reactions inherent in regeneration of the $SO_2$ laden with sulfide ion to produce elemental sulfur. The optimum pH range is therefore generally accepted as about 4.5 into the absorber and about 4.0 out of the absorber. This may be controlled by addition of soda ash and buffering agents.

Upon leaving the absorption tower, the $SO_2$-laden liquor containing the solid contaminants is preferably immediately filtered at 11 to remove at least a substantial portion of the solids. Normally when using $H_2S$ type of sulfur precipitation as illustrated in FIG. 2, such filtration of the absorption tower liquid effluent is desirable, but in the later described preferred form of the present invention utilizing aqueous calcium sulfide solution to regenerate the aqueous NaHS solution by treating the requisite portion of the absorption tower effluent, such filtration is not necessary because an efficient alternative method for removal of such solids is inherent.

After any desirable filtering of the absorption tower effluent, the $SO_2$ laden liquor is pumped to a sulfur precipitation and solution regeneration step, in which the $SO_2$ laden aqueous citrate solution is contacted with sulfide ion to precipitate elemental sulfur. When $H_2S$ is used to supply the sulfide ion the reaction must be carried out in a tightly closed, stirred reactor 12, precipitation and regeneration being accomplished by continuously introducing $H_2S$ gas in a long term average ratio of 2 moles $H_2S$ per mole of $SO_2$. Normally dilute $H_2S$ containing such inert gases as $CO_2$ and methane is used in this reaction, since that is the form of $H_2S$ coming from the standard $H_2S$ generator utilizing methane and sulfur over an alumina catalyst at elevated temperatures. When using such dilute $H_2S$ in such a precipitation and regeneration reaction two or more reactors are required with countercurrent flow of $H_2S$ and $SO_2$ solution to permit excessive venting of the inert gases and $H_2S$ gas. This vent stream is subsequently incinerated to burn the contained $H_2S$ to $SO_2$ and the resultant gas is passed through the absorber.

After precipitation of the sulfur, the sulfur must be separated from the regenerated buffered solution.

In the prior art process illustrated by FIG. 1, the starting gas is first cleaned of solid contaminants before the $SO_2$ is absorbed therefrom, which makes possible quite simple separation of sulfur, as previously described.

However, according to the present invention, despite the fact that the starting gases are not precleaned of solid contaminants, the separation of sulfur is surprisingly quite simple, as illustrated by the following discussion in connection with FIG. 2.

Because of the low sulfur content of the initial slurry, partial dewatering preferably is first done. The slurry from the reactor 12 is passed to the primary sulfur separator 13 where an initial separation of the sulfur and regenerated clear solution is made, the regenerated clear solution being recycled to the $SO_2$ absorption tower 10 through conduit 14. The primary sulfur separator 13 illustrated in FIG. 2 is a commercially available entrained air flotation separator such as commonly used for copper ore concentrations, consisting of an inlet stilling section, an outlet section, and about four flotation separation compartments each of approximately cubical liquid-filled dimension with each compartment having a liquid volume that is approximately equal to the total flow per minute through the compartment of sulfur slurry in regenerated solution. Each compartment has an air entrainment device 13a. Examples of separators that may be used are the "Wemco Depurator" Flotation Machine of Envirotech Corporation, the "Quadricell" Separator of United States Filter Corporation, and the "Denver" Dispersed Air Flotation Machine of the Denver Equipment Division of Joy Manufacturing Co.

In the process illustrated by FIG. 2, the sulfur slurry concentrate emanating from the separator 13 is then heated under pressure to above the melting point of sulfur in a heater 15, which may be a known steam-heated jacketed double pipe heat exchanger. The slurry is then passed into a heated pressurized decanter vessel 16, similar to an autoclave, in which components of the slurry are allowed to separate by gravity into a layer of citrate solution, a layer of pure molten sulfur, a layer of impurities in molten sulfur at the upper portion of the pure molten sulfur layer, and another layer of impurities in citrate solution at the lower portion of the citrate solution layer.

The contents of vessel 16 are preferably maintained at a temperature, preferably between about 125° C. and 145° C., sufficient to maintain the sulfur in a molten condition, and at a pressure, which may be about 35 psig, sufficient to substantially suppress, and preferably completely prevent, vaporization of the liquid in the slurry and its separation from the solids in the slurry. The temperature and pressure used in heater 15 are established by similar considerations.

In continuous processing, the decanter vessel 16 used for the separation should be sufficiently large to provide sufficient dwell time to permit all of the several gravity separations to occur and to allow pure molten sulfur to be withdrawn from the bottom of the tank. A citrate solution throughout dwell time of five minutes and a molten sulfur dwell time of one to twelve hours is suitable in most cases to effect the desired separations.

It has been found that the concentrated sulfur slurry maintained at a temperature above the melting point of sulfur will form five separate and distinct layers on standing. The first layer at the bottom of the vessel is the heaviest phase consisting of essentially pure (99.99%) elemental sulfur, of a straw yellow color, which can be continuously or intermittently removed from the bottom of the vessel 16 through conduit 17. The next higher and lighter layer, the second layer, is approximately 99% elemental sulfur having approximately 1% of solid metallic salts ranging in particle size from submicron to about 100 microns floating in or on the sulfur since these salts are insoluble in molten sulfur. These metallic salts are believed to enter the circulating liquid at soluble portions of the entrained gas-solid contaminants during absorbing steps, and to coprecipitate with the elemental sulfur and/or to precipitate as a result of oxidation or reduction reactions taking place in the vessel 16 due principally to the temperature therein. This layer can be allowed to build up and then be discharged through conduit 18 and filter 19 to remove all or nearly all of the contained metallic salts from the molten sulfur since the metallic salts are insoluble solids.

The next higher and lighter layer, the third layer, comprises solids wetted by the aqueous citrate solution and floating above the surface of the contaminated molten sulfur layer; this layer contains a much higher percentage of solids than that found floating in the elemental sulfur. These solids are also of a different composition in that they have been found to consist of carbonaceous materials with little metallic salts present. This thick mud-like layer of impurities is capable of flowing through a pipe and therefore it can be allowed to build up in the decanter vessel 16 and be occasionally decanted off the sulfur layers through line 20, and the citrate solution therein can be readily filtered through filter 21, cooled by cooler 23, and passed to the absorption tower 10, as through conduit 14. The carbonaceous impurities can then be discarded.

The next higher and lighter layer, the fourth layer, consists essentially entirely of aqueous citrate solution which can be decanted off through conduit 22, cooled by cooler 23, and recycled directly to the absorption tower 10 as through conduit 14, or drawn off with the lower third layer and separated by filtration before recycle.

The uppermost layer, the fifth layer, consists of aqueous citrate solution along with nodules of incompletely melted sulfur which contain bubbles of gaseous materials that cause the nodules to have an appparent density less than that of the aqueous phase. These nodules of sulfur, if desired, can be recovered and recycled by merely holding them in vessel 16 for a time sufficient for them to melt and fall as globules of molten sulfur through the intermediate layers to the lower layer of molten sulfur. The amount of sulfur present as nodules is small, especially if the heating is performed at a sufficient time and temperature to allow sufficient heat transfer to effect melting of substantially all of the sulfur. Therefore, if desired, such floating sulfur nodules could be discarded by merely drawing off the bulk of the citrate solution, filtering them, discharging solids, and recycling the separated citrate solution.

In the final processing step in the process of the invention illustrated in FIG. 2, when $H_2S$ is utilized to precipitate sulfur and regenerate the aqueous citrate solution, is the regeneration of sufficient $H_2S$ supply the process. For this purpose, approximately two-thirds of the sulfur produced must be vaporized and introduced along with methane ($CH_4$) and steam into a catalytic reactor 24 at about 700° C., or at about 350° C. when alumina is catalyzed, to produce a gas containing approximately 78% $H_2S$ and 22% $CO_2$. This gas passes from reactor 23 to sulfur precipitation and solution regeneration reactor 12.

Figure 3:
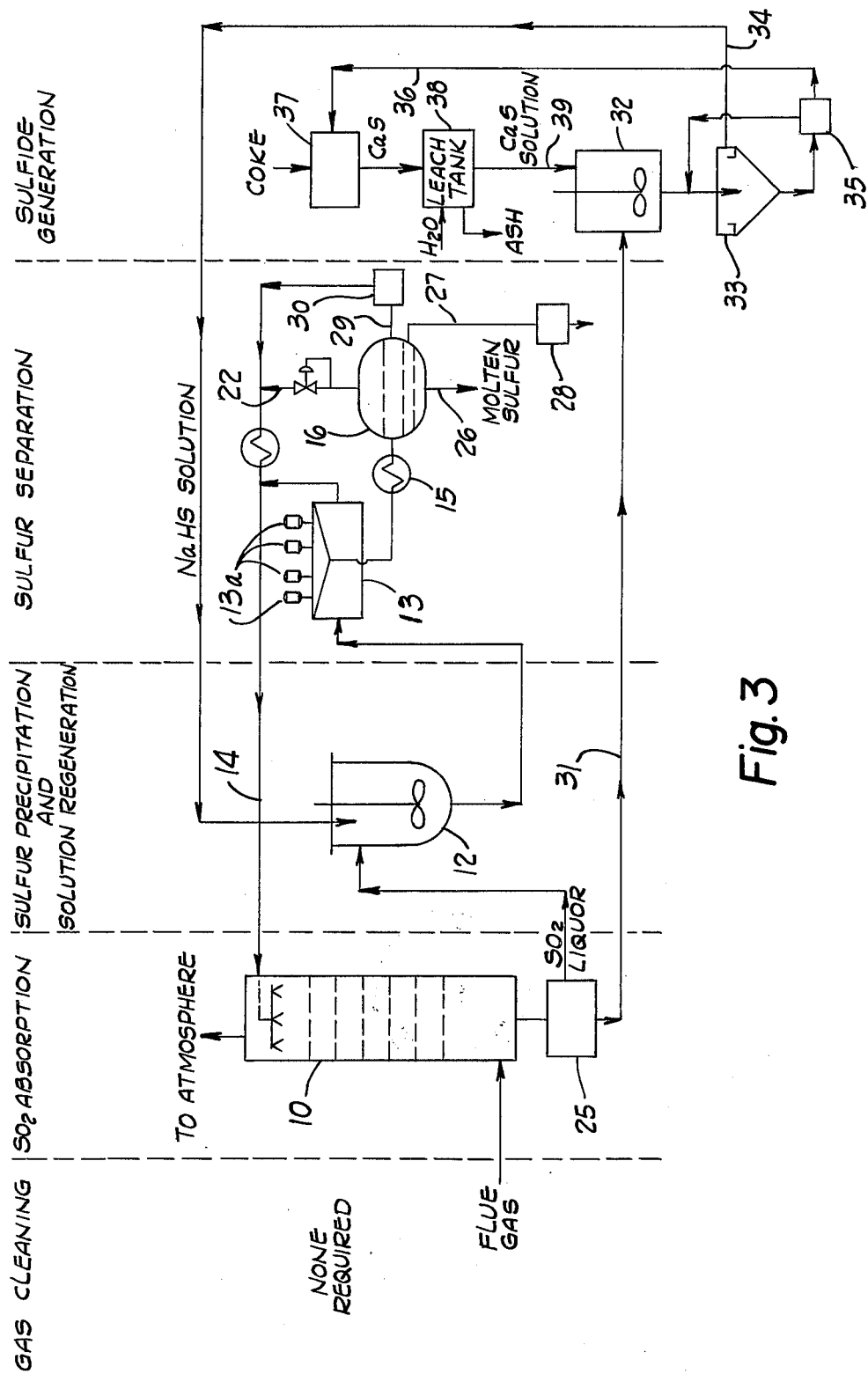
FIG. 3 illustrates the preferred embodiment of the instant invention utilizing sodium bisulfide as the sulfide ion source.

In the preferred embodiment of the present invention illustrated by FIG. 3, the process is substantially similar to FIG. 2, but an aqueous solution of NaHS is utilized as the sulfide ion source instead of $H_2S$.

For convenience, parts of the apparatus that can be identical in FIGS. 2 and 3 bear the same reference numerals in both Figures.

In the preferred embodiment of the invention illustrated by FIG. 3, an $SO_2$-containing gas containing entrained particulate solids is scrubbed in absorption tower 10, without prior cleaning of the gas, with an aqueous sodium citrate solution which absorbs nearly all of the $SO_2$ from the gas along with entrained solids such as fly ash. The resultant slurry is split as unit 25, which may be a hydroclone, gravity settler-decanter, in-line filter, or other suitable device.

Approximately one-third of the solution with preferably no solids passes from unit 25 to a sulfur precipitation and citrate solution regeneration reactor 12. Here the $SO_2$ containing solution is contacted with an aqueous solution of NaHS which precipitates sulfur while regenerating the citrate solution. The resulting slurry of sulfur and regenerated solution is then passed to a primary sulfur separator 13 where an initial separation of the sulfur and regenerated clear solution is made with the solution being recycled to the $SO_2$ absorption. Here sulfur slurry concentrate produced in the preferred embodiment of the instant invention is skimmed as an unstable froth from the surface of the regenerated solution. The unstable froth reverts quickly to a slurry of contaminated sulfur, preferably in the range of about 5% to about 15% of solids by weight that facilitates each of operation and handling. The slurry is then heated under pressure by melter 15 to above the melting point of sulfur, and subsequently passed to and held at suitable temperature and pressure in decanter vessel 16 to allow the formation by gravity settling of the several layers described as discussed above in connection with FIG. 2.

The molten essentially pure sulfur is drawn off through conduit 26, the solids-contaminated molten sulfur is drawn off through conduit 27 and passed through filter 28 to remove the solids, the aqueous citrate solution contaminated with solids is drawn off through conduit 29 after the solids are removed by filter 30 and the resulting filtered citrate solution passed back to absorption tower 10 through conduit 14, and the essentially pure citrate solution is passed through conduit 22 and conduit 14 to tower 10. The remaining constituents in the contents of vessel 16 may be handled as in the embodiment of FIG. 2.

The remaining approximate two-thirds portion of the split stream of $SO_2$-laden solution, containing essentially all of the undissolved solids, is utilized to manufacture the process required amounts of NaHS solution. This is accomplished by passing it through conduit 31 and contacting the $SO_2$-laden solution in stirred reactor 32 with a stoichiometric quantity of a strong solution of calcium sulfide, CaS, which increases the pH of the solution slightly and precipitates the contained sodium bisulfite as calcium sulfite while generating sodium bisulfide in the solution. Simultaneously, insoluble sulfides of heavy metals, if present, may also precipitate. The solids in the slurry of solid calcium sulfite, entrained solids, and NaHS in sodium citrate solution are then separated by appropriate means 33 such as a hydroclone or a thickener, and the resulting clear solution from unit 33 passes through conduit 34 to the sulfur precipitation and citrate regeneration reactor 12, in which such clean solution is added to the previously separated one-third portion of the split stream of $SO_2$-laden solution. The separated solids are passed from unit 33 through filter 35 and conduit 36 to reactor 37 in which they are reduced with coke or coal or the like at red heat as is known in the art so as to convert the contained calcium sulfite to calcium sulfide. The resulting CaS is then dissolved by leaching in unit 38 with water out of the impure solid mixture, to provide the process needs for calcium sulfide solution. The removal of fly ash and entrained solids from the circulating citrate solution can be made prior to contacting the solution with calcium sulfide, if desired.

When calcium sulfite precipitates upon being reacted with calcium sulfide, calcium sulfate can also precipitate. In such case the calcium sulfate, with the calcium sulfite, is separated from the aqueous solution of sodium bisulfide before the aqueous solution of sodium bisulfide is passed back to the sulfur precipitation and absorbent zone.

Similar reactions occur if other alkaline earth metal sulfides are used in place of calcium sulfide, and if other alkali metal bisulfides of ammonium bisulfide are used in place of the sodium bisulfide.

The operation of subjecting calcium sulfite, which may contain some calcium sulfate along with entrained solid contaminants, to a reducing atmosphere to yield calcium sulfide, can be similar to that used in making calcium sulfide for use as a depilatory in the tanning industry wherein an alkaline earth metal sulfite and/or sulfate is reduced with coke to the sulfide in a rotary kiln, which may be reactor 37, at temperatures of around 850° C. The product issuing from reactor 37 can be conveniently stored as is until needed, or can be immediately leached in unit 38 from the entrained solid impurities and passed through conduit 39 into reactor 32 for reuse in the process as a strong solution of calcium sulfide.

It should be noted that the clear solution containing sodium bisulfide is not regenerated and cannot be returned to the absorber tower 10, without first passing through the regenerator 12.

This preferred form of the present invention exemplified in FIG. 3 also eliminates the need for the removal of sulfate ion accumulations, as was necessary in all prior processes utilizing citrate buffered absorption. These processes used fractional crystallization of the sodium sulfate decahydrate. In the preferred form of the present invention sulfate ion is continuously removed from the system by the calcium sulfide treatment used to generate the NaHS solution, being subsequently converted along with calcium sulfite into calcium sulfide which is leached from the other entrained solids and preferably returned to the closed cycle system and from which it issues as elemental sulfur.

In the preferred form of the invention it is only necessary to eliminate solid-contaminated liquor from the approximately one-third of the total absorption tower effluent being diverted to the sulfur precipitation unit operation. This can be accomplished by the use of the unit 25, so that most of the solids contained in the liquor leaving the absorption tower 10 are preferentially discharged to the reactor 32 for treatment with calcium sulfide.

In this preferred form of the invention, an aqueous NaHS solution is used to supply the sulfide ion. Since both reactants in the preferred embodiment of the present invention are liquids, the need for mass transfer from the gas phase to the liquid phase, as when $H_2S$ gas is used, is eliminated along with the multi-reactor with venting set-up required when utilizing dilute H₂S gas as the sulfide source, thus decreasing the size, complexity and cost of the regeneration reactors. Eliminating of the vent also eliminates H₂S contained in the vent gas; previously such vent gas necessitated incineration to SO₂ for subsequent absorption in the absorber, which required two moles of H₂S additional charge in the regenerator reactor for each mole of H₂S covented and burned to SO₂. The present invention thus decreases the quantity of sulfur that otherwise would be precipitated and melted without benefit. Likewise, this preferred embodiment of the present invention avoids the need for handling expensive and hazardous hydrogen sulfide gas.

Another important advantage arising from the preferred process as illustrated in FIG. 3, is that the sulfur precipitation and regeneration equipment and the sulfur separation equipment along with associated material handling equipment, need be only about one-third the size of, and consequently substantially less costly than such equipment in a conventional H₂S precipitation plant of the same capacity. The conventional plant utilizing H₂S as a sulfide source, must, to be in balance, precipitate all the sulfur and handle it through the rest of the process, only to then have to use about two-thirds of the produced sulfur to form the required H₂S. In this preferred form of the invention, all sulfur precipitated is product. The sulfide make-up is generated directly from absorber effluent.

The chemistry of the known buffered sulfur recovery processes is indicated by the following equation:

$$SO_2 + 2H_2S \rightarrow 3S^\circ + 2H_2O$$

Overall, the chemistry of the preferred embodiment of the present invention is represented by the chemical equations:

$$2NaHSO_3 + 2CaS \rightarrow 2NaHS + 2CaSO_3$$

$$NaHSO_3 + 3H_2NaCit + 2NaHS \rightarrow 3S^\circ + 3HNa_2Cit + 3H_2O$$

$$HNa_2Cit + H_2O + SO_2 \rightarrow NaHSO_3 + H_2NaCit$$

$$2CaS + 3SO_2 \rightarrow 3S^\circ + 2CaSO_3$$

$$2CaSO_3 + 3C \rightarrow 2CaS + 3CO_2$$

The actual chemistry is much more complex in that it appears that a number of complexes of SO₂ and the stripping solution are formed along with numerous sulfur compounds. A particular discussion of the complexity of the chemistry can be found in Bureau of Mines Report of Investigations/1973 7774. However, for the purposes of the invention, such complexity need not be of concern since the desired results are obtainable by the proper practice of the invention. It is clear, however, that SO₂ can be absorbed selectively from SO₂ containing gaseous emissions such as power plant flue gases, smelter off-gases, or tail gases from a Claus plant, by contacting such SO₂ containing gaseous emissions with a buffered absorbent such as an aqueous solution of citric acid. As is known, absorption of SO₂ in aqueous solution is pH-dependent, increasing at higher pH. Because dissolution of SO₂ forms sulfurous acid and therefore lowers the pH of the absorbent, water alone cannot economically be used to absorb SO₂ although it will do the job at relatively low loading of SO₂. A straight water absorption system would require a significantly higher quantity of water absorbent as well as significantly larger equipment for processing absorbed SO₂ to elemental sulfur. However, by buffering the water absorbent, the pH drop is prohibited during SO₂ absorption and thus substantially higher SO₂ loadings can be obtained.

Moreover, each of the methods described above, the hydrogen ion balance of the closed recycle system of the aqueous buffered solution may be adjusted toward increased acidity by partially carbonating the strong calcium sulfide or other alkaline earth metal sulfide solution, as by contacting it with flue gas to increase acidity by converting calcium or other alkaline earth metal sulfide to the bisulfide with simultaneous precipitation and subsequent separation and discarding of calcium carbonate or other alkaline earth metal carbonate, and toward decreased acidity by adding limestone to the precipitated calcium sulfite or other alkaline earth sulfite prior to calcining and leaching, as may be desired to attain preferred or optimum operating ranges of pH.

If desired, sulfide ion in the process of the invention may be provided by an aqueous solution of alkali metal sulfide such as sodium sulfide in combination with a source of hydrogen ion such as sulfuric acid. Such source of sulfide ion may be used in the processes illustrated by both FIGS. 1 and 2.

The present invention thus provides processes for effectively removing from gaseous emissions or effluents, such as flue gases from industrial facilities or other sources, contained sulfur oxides that include SO₂ and that may also include other sulfur containing compounds such as H₂SO₄ or SO₃. The invention also makes possible such effective removal at substantially lowered costs for equipment and operation, with great reduction in or elimination of other types of pollution arising in prior processes, together with the recovery of useful and valuable by-products such as elemental sulfur.

More specifically the invention, and particularly the preferred embodiment of the invention, makes possible the advantages among others, of eliminating a hydrogen sulfide generator with its attendant hydrogen plant which in turn would require carbon dioxide absorption and stripping; of eliminating the need for a separate sulfate crystallizer circuit and its related by-product of sodium sulfate which would require disposal; of reducing of soda ash make-up required in prior systems to offset the sodium sulfate production; of substitution of coal or coke as the reductant with the consequent elimination of any need for naphtha or methane feed stock to a hydrogen plant or hydrogen sulfide generator; of great reductions in the sizes and costs of the sulfur melting, decanting, and molten sulfur handling equipment, as much as by two-thirds; eliminating of recycle sulfur; of provision of simple and convenient storage of regeneration reagent in the form of either black ash or concentrated calcium sulfide solution; of eliminating safety hazards associated with production or handling of hydrogen sulfide; and of capability of operating at a higher pH, and thus a higher SO₂ loading, leaving the absorption section.

The present invention, therefore, makes possible substantial reduction in atmospheric pollution at lower economic costs and with reduction and elimination of other types of pollution resulting from prior processes.

Usually, gaseous emissions from industrial facilities that contain sulfur dioxide also contain minor amounts of other sulfur-containing compounds, such as other sulfur oxides including sulfur trioxide, or sulfuric acid. The minor amounts of these compounds do not impair the operation of the invention; and in fact these compounds are largely if not entirely removed from the gaseous emissions and converted into sulfur and other compounds by the processes of the invention. Therefore, in the claims, the term "sulfur dioxide" not only includes sulfur dioxide as such but also a mixture of sulfur dioxide with minor amounts of such other sulfur-containing compounds.

While the invention has been shown and described in connection with two specific embodiments thereof, these are intended for the purpose of illustration rather than limitation, and other modifications and variations in the embodiments herein shown and described will be apparent to those skilled in the art, all within the intended scope of the invention. Accordingly the patent is not to be limited to the specific embodiments herein shown and described, nor any other way that is inconsistet with the extent to which the progress in the art has been advanced by the invention.

What is claimed is:

1. A method for removing sulfur dioxide from sulfur dioxide-containing gaseous emission having entrained solid contaminants therein, which method comprises:
   absorbing said sulfur dioxide and undissolved entrained solid contaminants in an acidic aqueous buffered absorbent from said gaseous emission in an absorption zone;
   separating undissolved entrained solid contaminants from said sulfur dioxide-containing buffered absorbent,
   passing to a sulfur precipitation and absorbent regeneration zone at least a portion of the sulfur dioxide-containing buffered absorbent from which undissolved entrained solid contaminants have been separated,
   introducing into said sulfur dioxide-containing buffered absorbent in said sulfur precipitation and absorbent regeneration zone sulfide ion in an amount sufficient to precipitate sulfur as elemental sulfur from said sulfur dioxide-containing buffered absorbent,
   heating said precipitated elemental sulfur along with said buffered absorbent and entrained precipitated solid impurities under conditions that melt said elemental sulfur while substantially suppressing vaporization of said buffered absorbent,
   maintaining said heating and said conditions to cause said elemental sulfur to remain molten for a sufficient period of time to allow phase separation by gravity of molten sulfur from buffered absorbent, of solid impurities from buffered absorbent, and solid impurities from molten sulfur, and
   recovering essentially pure elemental sulfur from a lower separated phase.

2. A method for removing sulfur dioxide from sulfur dioxide-containing gaseous emission having entrained solid contaminants therein, which method comprises,
   absorbing said sulfur dioxide and undissolved entrained solid contaminants in an acidic aqueous buffered absorbent from said gaseous emission in an absorption zone,
   separating undissolved entrained solid contaminants from said sulfur dioxide-containing buffered absorbent,
   passing to a sulfur precipitation and absorbent regeneration zone at least a portion of the sulfur dioxide-containing buffered absorbent from which undissolved entrained solid contaminants have been separated,
   introducing into said sulfur dioxide-containing buffered absorbent in said sulfur precipitation and absorbent regeneration zone sulfide ion in an amount sufficient to precipitate sulfur as elemental sulfur from said sulfur dioxide-containing buffered absorbent,
   heating said precipitated elemental sulfur along with said buffered absorbent and entrained precipitated solid impurities under conditions that melt said elemental sulfur while substantially suppressing vaporization of said buffered absorbent,
   maintaining said heating and said conditions to cause said elemental sulfur to remain molten for a sufficient period of time to allow phase separation by gravity of molten sulfur from buffered absorbent, of solid impurities from buffered absorbent, and solid impurities from molten sulfur,
   recovering essentially pure elemental sulfur from a lower separated phase,
   separating solid impurities from buffered absorbent in a separated phase, comprising buffered absorbent and solid impurities, above said lower separated phase of molten sulfur, and using said buffered absorbent from which solids have been removed in said absorption zone.

3. The method of claim 1 in which vaporization of said buffered absorbent is prevented while said precipitated sulfur buffered absorbent and entrained solid impurities are heated.

4. The method of claim 2 including separating solid impurities from a separated phase of a mixture of sulfur and solid impurities and thereby recovering essentially pure elemental sulfur.

5. The method of claim 1 in which said elemental sulfur being heated is in an aqueous liquid and said sulfur and liquid are heated to a temperature of about 121° C. to 145° C.

6. The method of claim 2 in which said elemental sulfur being heated is in an aqueous liquid and said sulfur and liquid are heated to a temperature of about 121° C. to 145° C.

7. The method of claim 1 in which the buffered absorbent is an aqueous citrate solution, and sulfide ion is selected from the group consisting of hydrogen sulfide and sodium bisulfide.

8. The method of claim 2 in which the buffered absorbent is an aqueous citrate solution and sulfide ion is selected from the group consisting of hydrogen sulfide and sodium bisulfide.

9. The method of claim 1 in which the sulfide ion is selected from the group consisting of hydrogen sulfide, alkali metal sulfide and a source of hydrogen ion, alkali metal bisulfides, and ammonium bisulfide.

10. The method of claim 2 in which sulfide ion is selected from the group consisting of hydrogen sulfide, alkali metal sulfide and a source of hydrogen ion, alkali metal bisulfides, and ammonium bisulfide.

11. A method of removing sulfur dioxide from sulfur dioxide-containing gaseous emission, which method comprises:
   absorbing sulfur dioxide in an acidic aqueous buffered absorbent from said gaseous emission, passing a portion of the sulfur dioxide-containing buffered absorbent to a sulfur precipitation and absorbent regeneration zone, introducing into said sulfur dioxide-containing buffered absorbent in said sulfur precipitation and absorbent regeneration zone, sulfide ion in the form of an aqueous solution of bisulfide, selected from the group consisting of alkali metal bisulfides, alkali metal sulfide and a source of hydrogen ion, and ammonium bisulfide, in an amount sufficient to precipitate sulfur in said sulfur dioxide-containing aqueous buffered absorbent as elemental sulfur, separating the elemental sulfur from the buffered absorbent and recycling said buffered absorbent to said absorption zone, passing a remaining portion of the sulfur dioxide-containing buffered absorbent from the first step set forth above to a sulfide generation zone, contacting said sulfur dioxide-containing buffered absorbent in said sulfide generation zone with sufficient quantities of a concentrated solution of alkaline earth metal sulfide to generate sulfide ion in the form of an aqueous solution of bisulfide selected from the group consisting of alkali metal bisulfides and ammonium bisulfide, and to precipitate alkaline earth metal sulfite, and separating said precipitated alkaline earth metal sulfite from said aqueous solution of bisulfide and passing said aqueous solution of bisulfide to said sulfur precipitation and absorbent regeneration zone.

12. The method for removing sulfur dioxide from sulfur dioxide-containing gaseous emission which method comprises absorbing sulfur dioxide in an acidic aqueous buffered absorbent from said gaseous emission, passing approximately one-third of the sulfur dioxide-containing buffered absorbent to a sulfur precipitation and absorbent regeneration zone, introducint into said sulfur dioxide-containing buffered absorbent in said sulfur precipitation and absorbent regeneration zone sulfide ion in the form of an aqueous solution of sodium bisulfide in an amount sufficient to precipitate the sulfur dioxide in said sulfur dioxide containing buffered absorbent as elemental sulfur, separating the elemental sulfur from the buffered absorbent and recycling said buffered absorbent to said absorption zone, passing the remaining approximately two-thirds of the sulfur dioxide-containing buffered absorbent from the first step set forth above to a sulfide generation zone, contacting said sulfur dioxide-containing buffered absorbent in said sulfide generation zone with sufficient quantities of a concentrated solution of calcium sulfide to generate sulfide ion in the form of an aqueous solution of sodium bisulfide and to precipitate calcium sulfite, and separating said precipitated calcium sulfite from said aqueous solution of sodium bisulfide and passing said aqueous solution of sodium bisulfide to said sulfur precipitation and absorbent regeneration zone.

13. The method of claim 10 in which the buffered absorbent is an aqueous citrate solution.

14. The method of claim 11 in which the buffered absorbent is an aqueous citrate solution.

15. The method of claim 11 in which alkaline earth metal sulfate is precipitated with said alkaline earth metal sulfite, and in which said sulfate and sulfite are separated from said aqueous solution of bisulfide before said bisulfide is passed to said sulfur precipitation and absorbent regeneration zone.

16. The method of claim 12 in which calcium sulfate is precipitated with said calcium sulfite, and in which said calcium sulfate and calcium sulfite are separated from said aqueous solution of sodium bisulfide before said aqueous solution of sodium bisulfide to said sulfur precipitation and absorbent regeneration zone.

17. The method of claim 11 comprising reducing said separated alkaline earth metal sulfite to alkaline earth metal sulfide.

18. The method of claim 12 comprising reducing said separated calcium sulfite to calcium sulfide.

19. The method of claim 17 comprising leaching said alkaline earth metal sulfide with water to form a solution of alkaline earth metal sulfide that is passed to the sulfide generation zone, and removing solids separated by leaching.

20. The method of claim 18 comprising leaching said calcium sulfide to form a solution of calcium sulfide that is passed to the sulfide generation zone, and removing solids separated by leaching.

21. The method of claim 11 in which the hydrogen ion balance of the aqueous buffered absorbent is adjusted as required toward increasing acidity by partially carbonating said solution of alkaline metal earth metal sulfide prior to its contacting the sulfur dioxide-containing buffered absorbent, to increase acidity by converting alkaline earth metal sulfide to alkaline earth metal bisulfide with precipitation, followed by separation, of alkaline earth carbonate.

22. The method of claim 12 in which the hydrogen ion balance of the aqueous buffered absorbent is adjusted toward increasing acidity by partially carbonating the aqueous solution of calcium sulfide, prior to its contacting the sulfur dioxide-containing buffered absorbent, to increase the acidity by converting calcium sulfide to calcium bisulfide with precipitation, followed by separation, of calcium carbonate.

23. The method of claim 19 in which the hydrogen ion balance of the aqueous buffered absorbent is adjusted toward decreasing the acidity by adding alkaline earth carbonate to the precipitated alkaline earth sulfite prior to its reduction.

24. The method of claim 20 in which the hydrogen ion balance of said aqueous buffered absorbent is adjusted to decrease acidity by adding calcium earth carbonate to the precipitated calcium sulfite prior to its reduction.

* * * * *